United States Patent
Ye

(10) Patent No.: US 10,206,208 B2
(45) Date of Patent: Feb. 12, 2019

(54) DEVICE AND METHOD OF HANDLING CHANNEL ACCESS PROCEDURES

(71) Applicant: HTC Corporation, Taoyuan (TW)

(72) Inventor: Shiang-Rung Ye, Taoyuan (TW)

(73) Assignee: HTC Corporation, Taoyuan (TW)

( * ) Notice: Subject to any disclaimer, the term of this patent is extended or adjusted under 35 U.S.C. 154(b) by 41 days.

(21) Appl. No.: 15/668,714

(22) Filed: Aug. 4, 2017

(65) Prior Publication Data

US 2018/0041996 A1 Feb. 8, 2018

Related U.S. Application Data

(60) Provisional application No. 62/371,242, filed on Aug. 5, 2016.

(51) Int. Cl.
*H04W 72/04* (2009.01)
*H04W 72/10* (2009.01)
*H04W 74/00* (2009.01)

(52) U.S. Cl.
CPC ..... *H04W 72/042* (2013.01); *H04W 72/0446* (2013.01); *H04W 72/10* (2013.01); *H04W 74/006* (2013.01); *H04W 74/008* (2013.01)

(58) Field of Classification Search
CPC .......... H04W 72/042; H04W 72/0446; H04W 72/10; H04W 74/006; H04W 74/008
See application file for complete search history.

(56) References Cited

U.S. PATENT DOCUMENTS 9,853,794 B2 * 12/2017 Wentink ................ H04L 5/0055
2013/0259008 A1 * 10/2013 Dinan ................. H04W 56/001
370/336

(Continued)

FOREIGN PATENT DOCUMENTS

| CN | 105472762 A | 4/2016 |
| WO | 2013/042908 A1 | 3/2013 |
| WO | 2015/116866 A1 | 8/2015 |

OTHER PUBLICATIONS

Office action dated May 22, 2018 for the Taiwan application No. 106126465, filing date Aug. 4, 2017, p. 1-9.

(Continued)

*Primary Examiner* — Mewale A Ambaye
(74) *Attorney, Agent, or Firm* — Winston Hsu

(57) ABSTRACT

A communication device of handling channel access procedures comprises a storage device storing instructions and a processing circuit coupled to the storage device. The processing circuit is configured to execute the instructions stored in the storage device. The instructions comprise receiving a first Physical Downlink Control Channel (PDCCH) signal indicating a first channel access procedure and a first priority class of the first channel access procedure from a network; performing the first channel access procedure with the network, after receiving the first PDCCH signal; receiving a second PDCCH signal indicating a second channel access procedure and a second priority class of the second channel access procedure from the network; and determining to continue or terminate the first channel access procedure with the network according to a comparison of the first priority class and the second priority class, after receiving the second PDCCH signal.

17 Claims, 6 Drawing Sheets

(56) References Cited

U.S. PATENT DOCUMENTS

2014/0023053 A1* 1/2014 Park ..................... H04W 48/10
370/336
2015/0334744 A1 11/2015 Ji

OTHER PUBLICATIONS

3GPP TS 36.213 V13.2.0 (Jun. 2016).
3GPP TR 36.889 V13.0.0, Jun. 2015.
ETSI EN 301 893 V1.7.2, Jul. 2014.
Final Report of 3GPP TSG RAN WG1 #80 v1.0.0, dated Feb. 2015.
Final Report of 3GPP TSG RAN WG1 #AH_LAA v1.0.0, dated Mar. 2015.
Search Report dated Dec. 12, 2017 for EP application No. 17185006.8, pp. 1-5.
InterDigital Communications, "Prioritization between RACH Procedures in LTE CA", 3GPP TSG-RAN WG2 #75bis, Tdoc R2-115409, Oct. 10-14, 2011, Zhuhai, China, XP050541073, pp. 1-3.

* cited by examiner

| Priority Classes | Allowed Contention Window Sizes |
|---|---|
| 1 | { 3 , 7 } |
| 2 | { 7 , 15 } |
| 3 | { 15 , 31 , 63 } |
| 4 | { 15, 31, 63, 127, 255, 511, 1023 } |

FIG. 6

DEVICE AND METHOD OF HANDLING CHANNEL ACCESS PROCEDURES

CROSS REFERENCE TO RELATED APPLICATIONS

This application claims the benefits of U.S. Provisional Application No. 62/371,242, filed on Aug. 5, 2016, which is incorporated herein by reference.

BACKGROUND OF THE INVENTION

1. Field of the Invention

The present invention relates to a communication device and a method used in a wireless communication system, and more particularly, to a communication device and method of handling channel access procedures in a wireless communication system.

2. Description of the Prior Art

When a user equipment (UE) is performing a channel access procedure, the UE may be notified to perform another channel access procedure by a network. However, the UE does not know how to handle the ongoing channel access procedure with the notification, because only one channel access procedure is allowed to be performed. Thus, how to handle the ongoing channel access procedures is an important problem to be solved.

SUMMARY OF THE INVENTION

The present invention therefore provides a method and related communication device for handling channel access procedures to solve the abovementioned problem.

A communication device of handling channel access procedures comprises a storage device for storing instructions and a processing circuit coupled to the storage device. The processing circuit is configured to execute the instructions stored in the storage device. The instructions comprise receiving a first Physical Downlink Control Channel (PDCCH) signal indicating a first channel access procedure and a first priority class of the first channel access procedure from a network; performing the first channel access procedure with the network, after receiving the first PDCCH signal; receiving a second PDCCH signal indicating a second channel access procedure and a second priority class of the second channel access procedure from the network; and determining to continue or terminate the first channel access procedure with the network according to a comparison of the first priority class and the second priority class, after receiving the second PDCCH signal.

A communication device of handling channel access procedures comprises a storage device for storing instructions and a processing circuit coupled to the storage device. The processing circuit is configured to execute the instructions stored in the storage device. The instructions comprise receiving a first Physical Downlink Control Channel (PDCCH) signal indicating a first channel access procedure and a first priority class of the first channel access procedure from a network; performing the first channel access procedure with the network, after receiving the first PDCCH signal; receiving a second PDCCH signal indicating a second channel access procedure and a second priority class of the second channel access procedure from the network; and continuing the ongoing first channel access procedure with the network and not performing the second channel access procedure, if the first priority class and the second priority class are the same.

A communication device of handling a channel access procedure comprises a storage device for storing instructions and a processing circuit coupled to the storage device. The processing circuit is configured to execute the instructions stored in the storage device. The instructions comprise receiving a first Physical Downlink Control Channel (PDCCH) signal indicating a first channel access procedure and a first priority class of the first channel access procedure from a network; performing the first channel access procedure with the network, after receiving the first PDCCH signal; receiving a second PDCCH signal indicating a second channel access procedure and a second priority class of the second channel access procedure from the network; and terminating the ongoing first channel access procedure and performing the second channel access procedure with the network, if the first priority class has a lower priority than the second priority class.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 is a schematic table of priority classes and allowed contention window sizes according to an example of the present invention.

DETAILED DESCRIPTION

Figure 1:
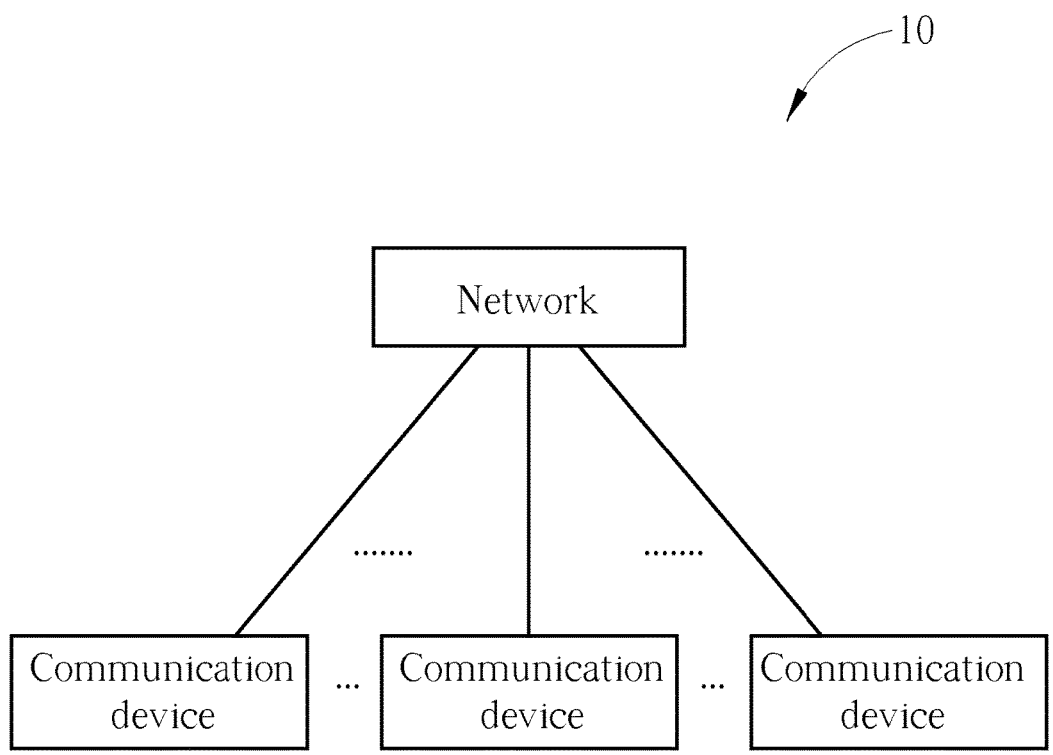
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. The network and the communication devices may communicate with each other via licensed channel (s) and/or unlicensed channel(s). A Listen Before Talk (LBT) procedure may be performed, when the communication device and the network communicate with each other via the unlicensed channel(s). The network may be a universal terrestrial radio access network (UTRAN) including at least one Node-Bs (NB) in a universal mobile telecommunications system (UMTS). Alternatively, the network may be an evolved UTRAN (E-UTRAN) including at least one evolved NB (eNB) and/or at least one relay in a long term evolution (LTE) system, a LTE-Advanced (LTE-A) system, an evolution of the LTE-A system, or a fifth generation (5G) system. Further, the network may also include both the UTRAN/E-UTRAN and a core network, wherein the core network includes network entities such as a mobility management entity (MME), a serving gateway (S-GW), a packet data network (PDN) gateway (P-GW), a self-organizing networks (SON) server and/or a radio network controller (RNC), etc.

The communication device may be a user equipment (UE), a mobile phone, a laptop, a tablet computer, an electronic book, a portable computer system, a vehicle or an aircraft. In addition, the network and the communication device can be seen as a transmitter or a receiver according to transmission direction, e.g., for a uplink (UL), the communication device is the transmitter and the network is the receiver, and for a downlink (DL), the network is the transmitter and the communication device is the receiver.

Figure 2:
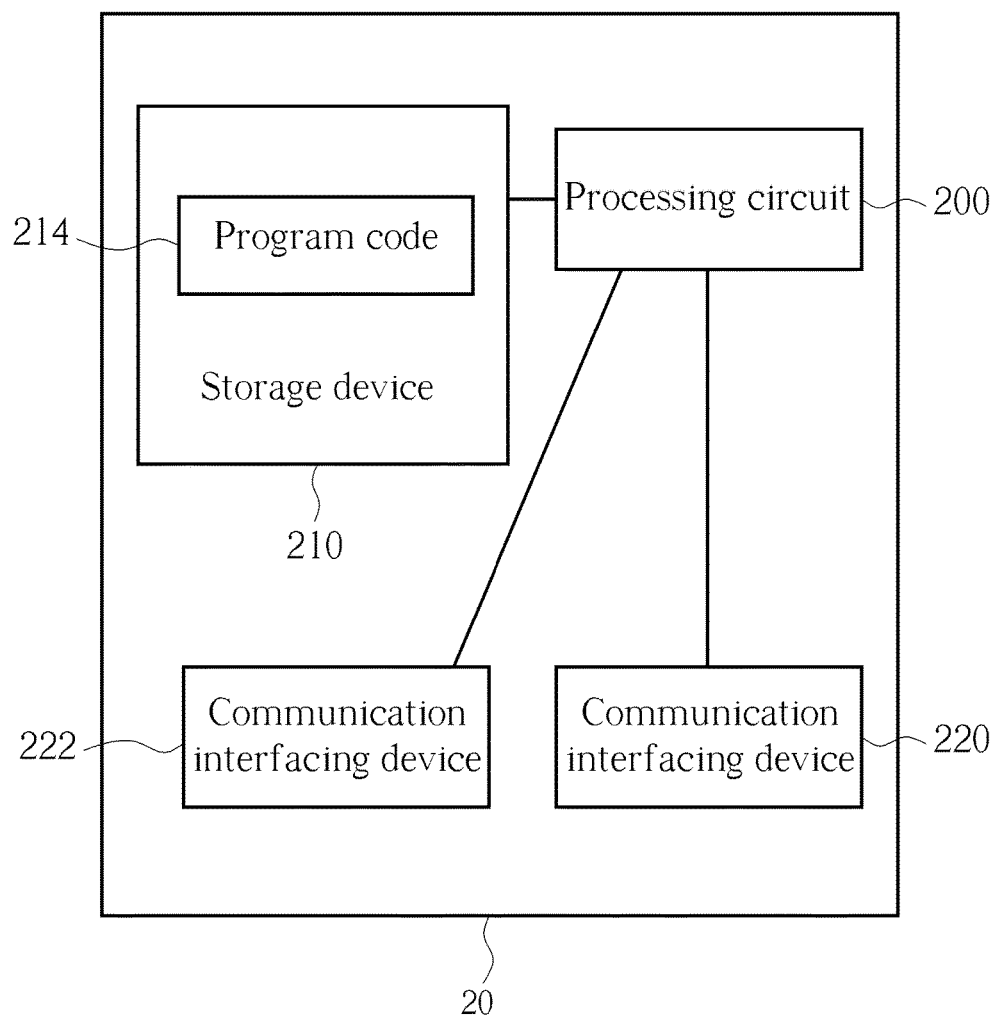
FIG. 2 is a schematic diagram of a communication device according to an example of the present invention.

FIG. 2 is a schematic diagram of a communication device 20 according to an example of the present invention. The communication device 20 may be the communication device or the network shown in FIG. 1, but is not limited herein. The communication device 20 may include a processing circuit 200 such as a microprocessor or Application Specific Integrated Circuit (ASIC), a storage device 210, a communication interfacing device 220 for cellular network transmission/reception (e.g., protocol data units (PDUs)), and a communication interfacing device 222 for wireless local area network (WLAN) (e.g., WiFi) transmission/reception (e.g., PDUs or internet protocol (IP) packets). The storage device 210 may be any data storage device that may store a program code 214 accessed and executed by the processing circuit 200. Examples of the storage device 210 include but are not limited to a read-only memory (ROM), flash memory, random-access memory (RAM), hard disk, optical data storage device, non-volatile storage device, non-transitory computer-readable medium (e.g., tangible media), etc. The communication interfacing devices 220 and 222 are preferably transceivers, and are used to transmit and receive signals (e.g., data, messages and/or packets) according to processing results of the processing circuit 200.

In the following examples, a UE is used for representing the communication device in FIG. 1, to simplify the illustration of the examples.

Figure 3:
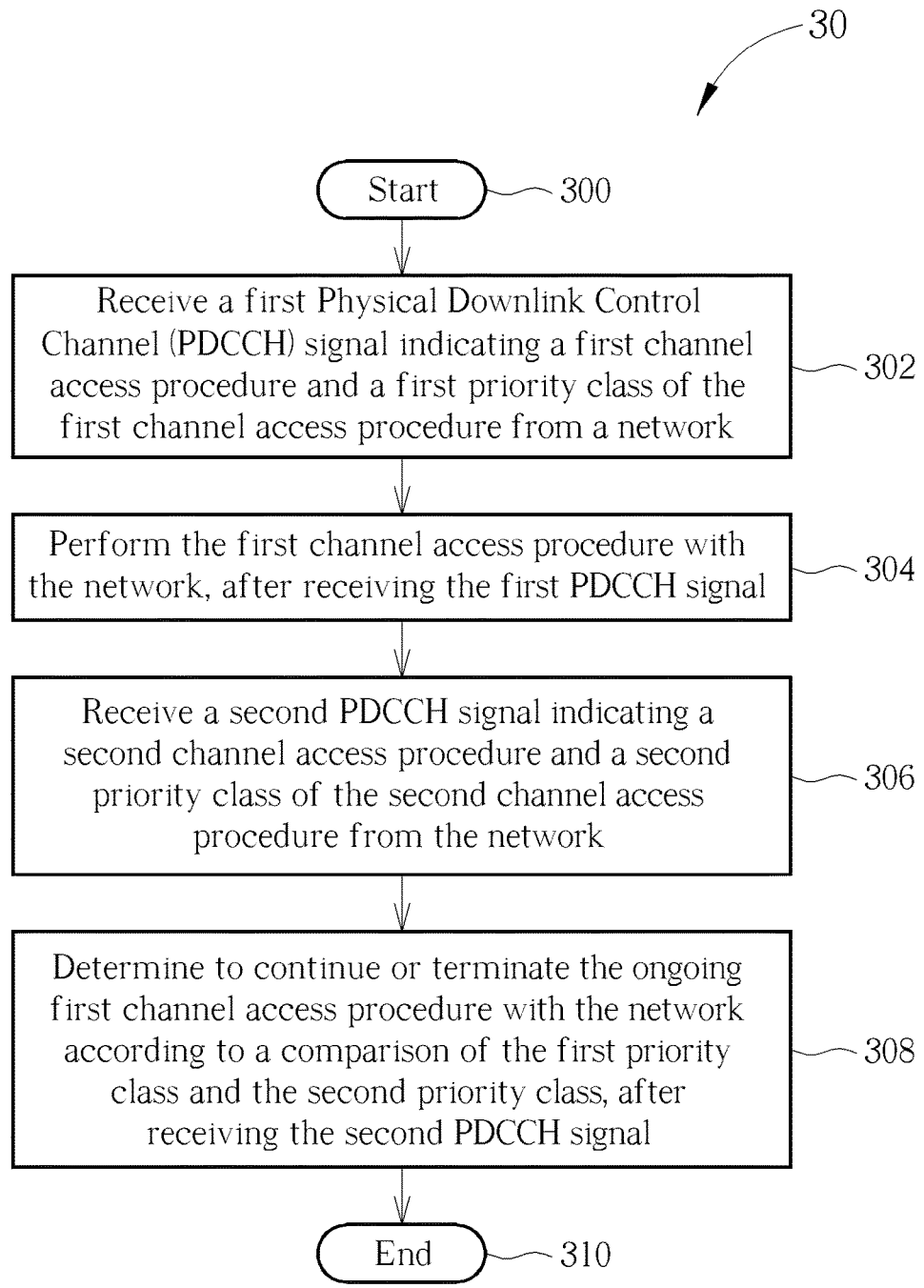
FIG. 3 is a flowchart of a process according to an example of the present invention.

FIG. 3 is a flowchart of a process 30 according to an example of the present invention. The process 30 may be utilized in a UE, to handle channel access procedures. The process 30 includes the following steps:

Step 300: Start.

Step 302: Receive a first Physical Downlink Control Channel (PDCCH) signal indicating a first channel access procedure and a first priority class of the first channel access procedure from a network.

Step 304: Perform the first channel access procedure with the network, after receiving the first PDCCH signal.

Step 306: Receive a second PDCCH signal indicating a second channel access procedure and a second priority class of the second channel access procedure from the network.

Step 308: Determine to continue or terminate the ongoing first channel access procedure with the network according to a comparison of the first priority class and the second priority class, after receiving the second PDCCH signal.

Step 310: End.

According to the process 30, the UE may receive a first PDCCH signal indicating a first channel access procedure and a first priority class (e.g., channel access priority class) of the first channel access procedure from a network (e.g., the network in FIG. 1). Then, the UE may perform the first channel access procedure with the network, after receiving the first PDCCH signal. The UE may receive a second PDCCH signal indicating a second channel access procedure and a second priority class of the second channel access procedure from the network. Further, the UE may determine to continue or terminate the ongoing first channel access procedure with the network according to (e.g., by comparing) the first priority class and the second priority class, after receiving the second PDCCH signal. That is, the UE handles the channel access procedures according to (e.g., by comparing) the priority classes. For example, the UE determines to continue or terminate the ongoing first channel access procedure with the network according to a comparison of the first priority class and the second priority class. Thus, the problem of handling the channel access procedures is solved.

Realization of the process 30 is not limited to the above description. The following examples may be applied for realizing the process 30.

In one example, the UE determines to continue (e.g., keep performing) the first channel access procedure with the network and not to perform the second channel access procedure, if the first priority class and the second priority class are the same. That is, the first channel access procedure is continued, if the first and second priority classes are the same. In one example, the UE determines to terminate the first channel access procedure, if the first priority class has a lower priority than the second priority class. In one example, the UE determines to further perform the second channel access procedure. In one example, the first channel access procedure and the second channel procedure are LBT procedures (e.g., Category 4 of the LBT (Cat. 4 LBT) as defined in the 3GPP standard).

In one example, the UE performs a first Physical Uplink Shared Channel (PUSCH) transmission according to (e.g., a first resource (e.g., time and/or frequency resource(s)) assigned in) the first PDCCH signal, after performing or continuing the first channel access procedure with the network. In one example, the UE performs a second PUSCH transmission according to (e.g., a second resource assigned in) the second PDCCH signal, after performing the second channel access procedure with the network.

Figure 4:
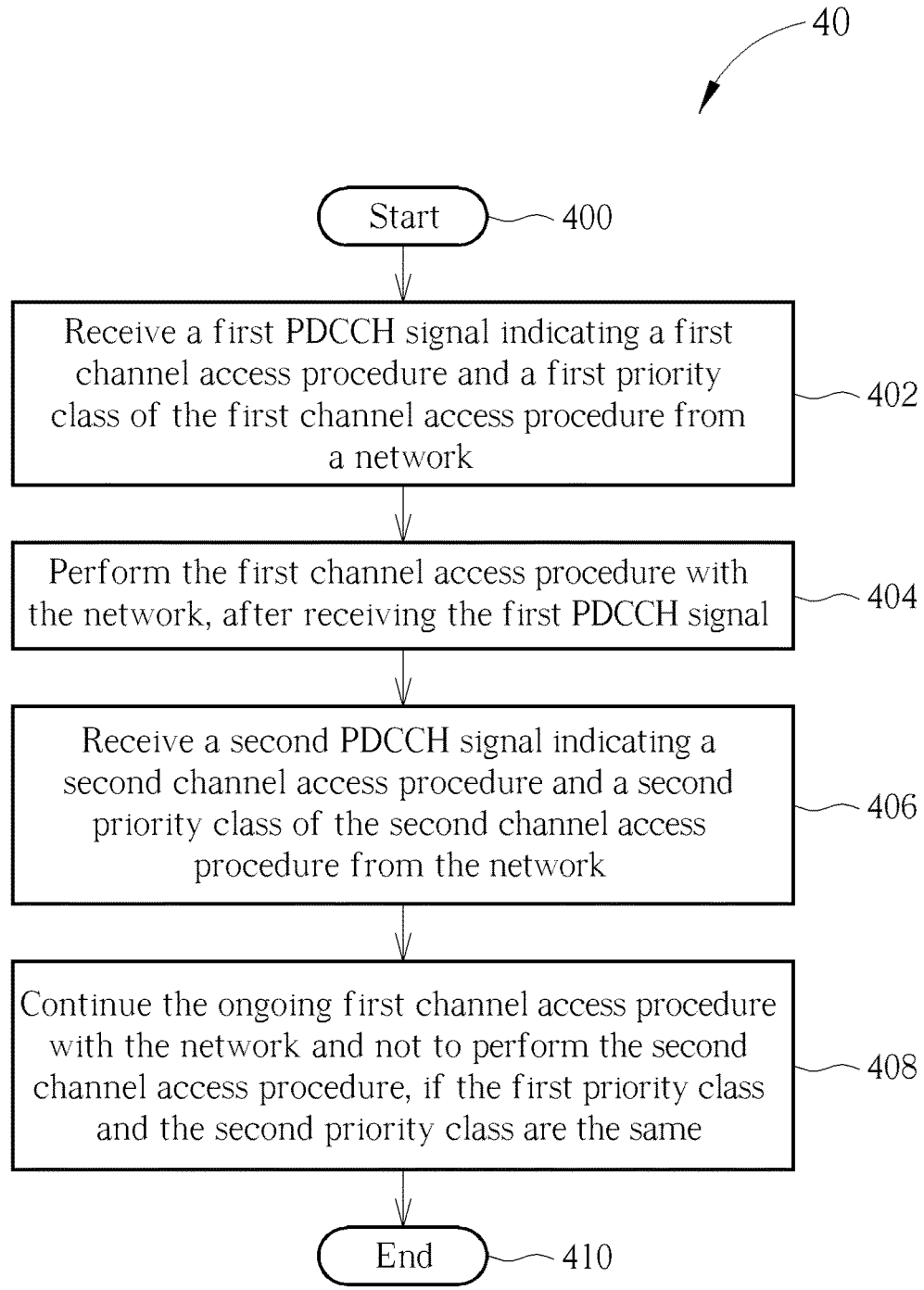
FIG. 4 is a flowchart of a process according to an example of the present invention.

FIG. 4 is a flowchart of a process 40 according to an example of the present invention. The process 40 may be utilized in a UE, to handle channel access procedures. The process 40 includes the following steps:

Step 400: Start.

Step 402: Receive a first PDCCH signal indicating a first channel access procedure and a first priority class of the first channel access procedure from a network.

Step 404: Perform the first channel access procedure with the network, after receiving the first PDCCH signal.

Step 406: Receive a second PDCCH signal indicating a second channel access procedure and a second priority class of the second channel access procedure from the network.

Step 408: Continue the ongoing first channel access procedure with the network and not to perform the second channel access procedure, if the first priority class and the second priority class are the same.

Step 410: End.

According to the process 40, the UE may receive a first PDCCH signal indicating a first channel access procedure and a first priority class (e.g., channel access priority class) of the first channel access procedure from a network (e.g., the network in FIG. 1). Then, the UE may perform the first channel access procedure with the network, after receiving the first PDCCH signal. The UE may receive a second PDCCH signal indicating a second channel access procedure and a second priority class of the second channel access procedure from the network. Further, the UE may continue (e.g., keep performing) the ongoing first channel access procedure with the network and may not to perform the second channel access procedure, if the first priority class and the second priority class are the same. That is, the ongoing first channel access procedure is continued, if the first and second priority classes are the same. Thus, the problem of handling the channel access procedures is solved.

Realization of the process 40 is not limited to the above description. The following examples may be applied for realizing the process 40.

In one example, the UE performs the first channel access procedure with the network according to (e.g., by using) a contention window size (e.g., allowed or used) for the first channel access procedure (i.e., corresponding to the first priority class). In one example, the first channel access procedure and the second channel procedure are LBT procedures (e.g., Category 4 of the LBT (Cat. 4 LBT) as defined in the 3GPP standard).

In one example, the UE performs a first PUSCH transmission according to (e.g., a first resource (e.g., time and/or frequency resource(s)) assigned in) the first PDCCH signal, after performing or continuing the first channel access procedure with the network.

Figure 5:
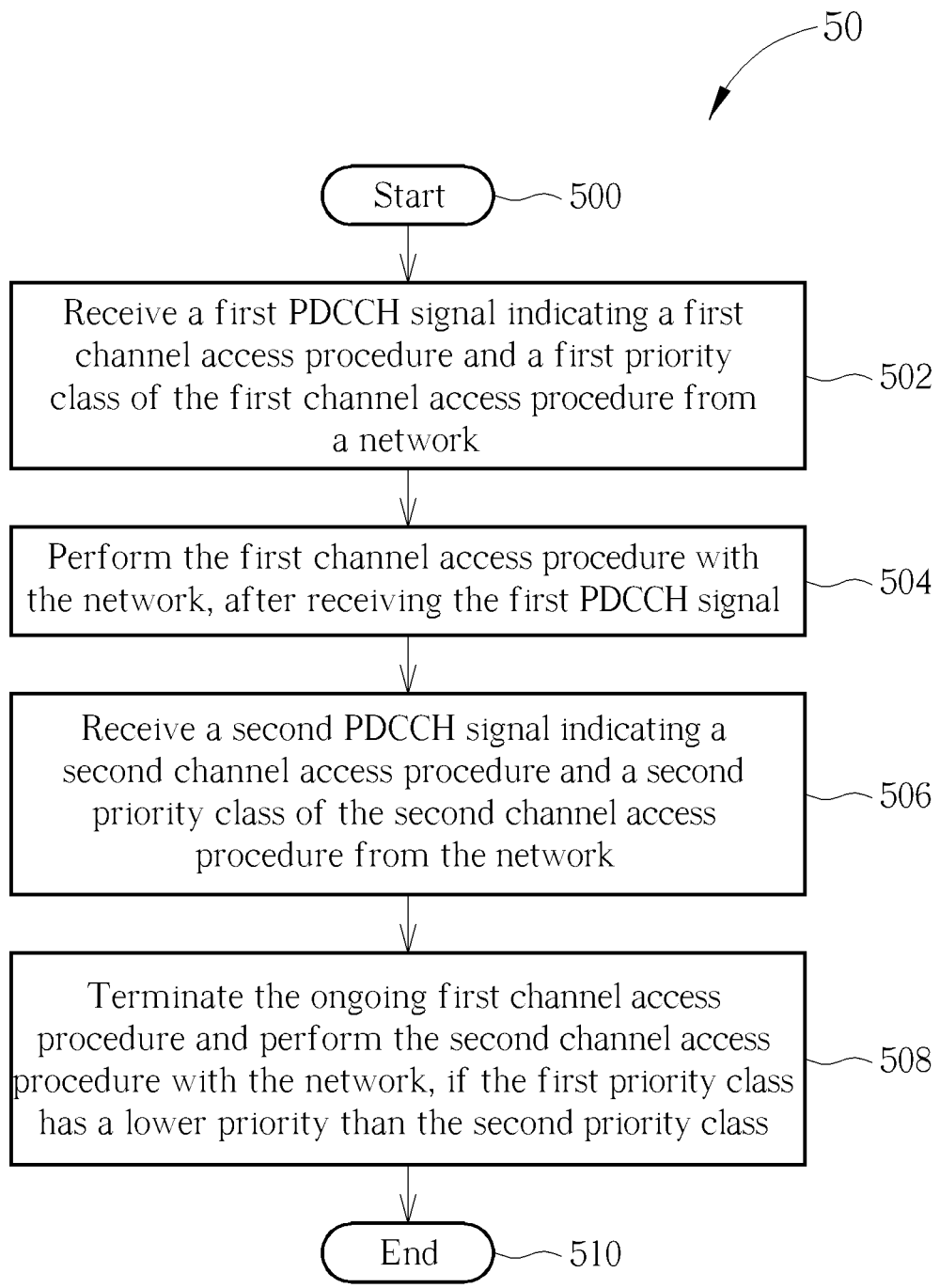
FIG. 5 is a flowchart of a process according to an example of the present invention.

FIG. 5 is a flowchart of a process 50 according to an example of the present invention. The process 50 may be utilized in a UE, to handle channel access procedures. The process 50 includes the following steps:

Step 500: Start.

Step 502: Receive a first PDCCH signal indicating a first channel access procedure and a first priority class of the first channel access procedure from a network.

Step 504: Perform the first channel access procedure with the network, after receiving the first PDCCH signal.

Step 506: Receive a second PDCCH signal indicating a second channel access procedure and a second priority class of the second channel access procedure from the network.

Step 508: Terminate the ongoing first channel access procedure and perform the second channel access procedure with the network, if the first priority class has a lower priority than the second priority class.

Step 510: End.

According to the process 50, the UE may receive a first PDCCH signal indicating a first channel access procedure and a first priority class (e.g., channel access priority class) of the first channel access procedure from a network (e.g., the network in FIG. 1). Then, the UE may perform the first channel access procedure with the network, after receiving the first PDCCH signal. The UE may receive a second PDCCH signal indicating a second channel access procedure and a second priority class of the second channel access procedure from the network. Further, the UE may terminate (e.g., abort) the ongoing first channel access procedure and may perform the second channel access procedure with the network, if the first priority class has a lower priority than the second priority class. That is, the UE handles the channel access procedures according to (e.g., by using) (e.g., a comparison of) the priority classes. Thus, the problem of handling the channel access procedures is solved.

Realization of the process 50 is not limited to the above description. The following examples may be applied for realizing the process 50.

In one example, the UE performs a second PUSCH transmission according to (e.g., a second resource (e.g., time and/or frequency resource(s)) assigned in) the second PDCCH signal, after performing the second channel access procedure with the network. In one example, the UE performs the first channel access procedure with the network according to (e.g., by using) a first contention window size (e.g., allowed or used) for the first channel access procedure (i.e., corresponding to the first priority class).

In one example, the UE performs the second channel access procedure with the network by setting a second contention window size for the second channel access procedure according to (e.g., by using) the first contention window size. For example, the UE may set the second contention window size to be the first contention window size, if the first contention window size is one of a plurality of contention window sizes (e.g., allowed or used) for the second channel access procedure (i.e., corresponding to the second priority class). For example, the UE may set the second contention window size to be a maximum contention window size of the plurality of contention window sizes (e.g., allowed or used) for the second channel access procedure (i.e., corresponding to the second priority class), if the first contention window size is larger than the maximum contention window size. For example, the UE may set the second contention window size to be a minimum contention window size of the plurality of contention window sizes (e.g., allowed or used) for the second channel access procedure (i.e., corresponding to the second priority class), if the first contention window size is smaller than the minimum contention window size.

In one example, the UE performs the second channel access procedure with the network according to the following steps. The UE determines (e.g., selects) a random number between a zero and the second contention window size. The UE stores the random number in a counter of the UE. The UE performs a carrier sensing on a channel (e.g., an unlicensed channel). In one example, the UE determines that the channel is not occupied, if the channel is idle for a first time interval after performing the carrier sensing. In one example, the UE decreases the counter by one, if the UE detects that the channel is idle for the first time interval. In one example, the UE determines that the channel is occupied if the channel is not idle for the first time interval, and performs the carrier sensing on the channel. The UE may perform the carrier sensing on the channel (e.g., continuously) until the UE determines that the channel is not occupied.

In one example, the UE decreases the counter by one, if the channel is idle for a second time interval after determining that the channel is not occupied. Then, the UE performs a second PUSCH transmission according to (e.g., a second resource assigned in) the second PDCCH signal, if the counter reaches the zero and the second PUSCH transmission is scheduled in a subframe. In one example, the UE receives a signal indicating whether the second PUSCH transmission is performed successfully from the network. In one example, the UE selects a third (e.g., next) contention window size from the plurality of contention window sizes (e.g., allowed or used) for the second channel access procedure, if the signal indicates that the second PUSCH transmission is performed unsuccessfully. In one example, the plurality of contention window sizes are sorted in an ascending order.

In one example, the UE performs the second PUSCH transmission according to (e.g., the second resource assigned in) the second PDCCH signal after determining that the channel is not occupied, if the second PUSCH transmission is scheduled in the subframe.

In one example, a length of the first time interval and a length of the second time interval are determined according to (e.g., by using) the second priority class (i.e., corresponding priority classes). For example, a priority class with a higher priority may be corresponding to a time interval with a shorter length, and a priority class with a lower priority may be corresponding to a time interval with a longer length.

In one example, the first channel access procedure and the second channel procedure are LBT procedures (e.g., Category 4 of the LBT (Cat. 4 LBT) as defined in the 3GPP standard).

FIG. 6 is a schematic table of priority classes and allowed contention window sizes according to an example of the present invention. As shown in FIG. 6, there are 4 priority classes corresponding to 4 sets of allowed contention window sizes, respectively. The priority class 1 has the highest priority, and the priority class 4 has the lowest priority.

In one example, the UE receives a first PDCCH signal indicating a first channel access procedure and a first priority class 4 of the first channel access procedure from a network. The UE may perform the first channel access procedure with the network according to a first contention window size 31. The UE performs a first PUSCH transmission according to (e.g., a first resource assigned in) the first PDCCH signal. Then, the UE receives a second PDCCH signal indicating a second channel access procedure and a second priority class 3 of the second channel access procedure from the network. The UE terminates the first channel access procedure and performs the second channel access procedure with the network, because the first priority class 4 has a lower priority than the second priority class 3.

The UE sets a second contention window size for the second channel access procedure to be the first contention window size 31, because the first contention window size 31 is one of the set of allowed contention window sizes corresponding to the second priority class 3. The UE performs the second channel access procedure with the network according to the second contention window size 31. The UE determines a random number between 0 and the second contention window size 31, and stores the random number in a counter of the UE. The UE performs a first carrier sensing on a channel. The UE decreases the counter by 1, if the channel is idle for a first time interval. The UE performs a second carrier sensing on the channel again. The UE decreases the counter by 1, if the channel is idle for a second time interval. The UE may perform a second PUSCH transmission according to (e.g., a second resource assigned in) the second PDCCH signal, if the counter reaches 0 and the second PUSCH transmission is scheduled in a subframe. The UE receives a signal indicating that the second PUSCH transmission is performed unsuccessfully from the network. The UE changes the second contention window size from 31 to 63 and performs the second channel access procedure with the network according to the second contention window size 63.

In another example, The UE receives a third PDCCH signal indicating a third channel access procedure and a third priority class 4 of the third channel access procedure from a network. The UE performs the third channel access procedure with the network according to a third contention window size 255. The UE may perform a third PUSCH transmission according to (e.g., a third resource assigned in) the third PDCCH signal. Then, the UE receives a fourth PDCCH signal indicating a fourth channel access procedure and a fourth priority class 2 of the fourth channel access procedure from the network. The UE terminates the third channel access procedure and performs the fourth channel access procedure with the network, because the third priority class 4 has a lower priority than the fourth priority class 2. The UE sets a fourth contention window size for the fourth channel access procedure to be a maximum contention window size of the set of allowed contention window sizes corresponding to the fourth priority class 2 (i.e., 15), because the third contention window size 255 is larger than the maximum contention window size 15. The UE performs the fourth channel access procedure with the network according to the fourth contention window size 15. The UE may perform a fourth PUSCH transmission according to (e.g., a fourth resource assigned in) the fourth PDCCH signal.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means be the communication device 20. Any of the abovementioned processes may be compiled into the program code 214.

To sum up, the present invention provides a method and related communication device for handling channel access procedures. Accordingly, the problem of handling the ongoing channel access procedure is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device of handling channel access procedures, comprising:
    a storage device, for storing instructions of:
    receiving a first Physical Downlink Control Channel (PDCCH) signal indicating a first channel access procedure and a first priority class of the first channel access procedure from a network;
    performing the first channel access procedure with the network, after receiving the first PDCCH signal;
    receiving a second PDCCH signal indicating a second channel access procedure and a second priority class of the second channel access procedure from the network; and
    determining to continue or terminate the ongoing first channel access procedure with the network according to a comparison of the first priority class and the second priority class, after receiving the second PDCCH signal; and
    a processing circuit, coupled to the storage device, configured to execute the instructions stored in the storage device;
    wherein the storage device further storing an instruction of performing the second channel access procedure with the network comprising:
    determining a random number between a zero and a second contention window size;
    storing the random number in a counter of the communication device; performing a carrier sensing on a channel;
    determining that the channel is not occupied, if the channel is idle for a first time interval after performing the carrier sensing;

determining that the channel is occupied if the channel is not idle for the first time interval, and performing the carrier sensing on the channel;

decreasing the counter by one, if the channel is idle for a second time interval after determining that the channel is not occupied; and performing a second PUSCH transmission according to the second PDCCH signal, if the counter reaches the zero and the second PUSCH transmission is scheduled in a subframe.

2. The communication device of claim 1, wherein the communication device determines to continue the first channel access procedure with the network and not to perform the second channel access procedure, if the first priority class and the second priority class are the same.

3. The communication device of claim 1, wherein the communication device determines to terminate the first channel access procedure, if the first priority class has a lower priority than the second priority class.

4. The communication device of claim 3, wherein the communication device determines to further perform the second channel access procedure.

5. The communication device of claim 1, wherein the storage device further storing an instruction of:

performing a first Physical Uplink Shared Channel (PUSCH) transmission according to the first PDCCH signal, after performing or continuing the first channel access procedure with the network.

6. A communication device of handling channel access procedures, comprising:

a storage device, for storing instructions of:

receiving a first Physical Downlink Control Channel (PDCCH) signal indicating a first channel access procedure and a first priority class of the first channel access procedure from a network;

performing the first channel access procedure with the network, after receiving the first PDCCH signal;

receiving a second PDCCH signal indicating a second channel access procedure and a second priority class of the second channel access procedure from the network; and continuing the ongoing first channel access procedure with the network and not performing the second channel access procedure, if the first priority class and the second priority class are the same; and a processing circuit, coupled to the storage device, configured to execute the instructions stored in the storage device;

wherein the communication device performs the first channel access procedure with the network according to a contention window size for the first channel access procedure and wherein the first channel access procedure and the second channel access procedure are Listen Before Talk (LBT) procedures.

7. The communication device of claim 6, wherein the storage device further storing an instruction of:

performing a first Physical Uplink Shared Channel (PUSCH) transmission according to the first PDCCH signal, after performing or continuing the first channel access procedure with the network.

8. A communication device of handling channel access procedures, comprising:

a storage device, for storing instructions of:

receiving a first Physical Downlink Control Channel (PDCCH) signal indicating a first channel access procedure and a first priority class of the first channel access procedure from a network;

performing the first channel access procedure with the network, after receiving the first PDCCH signal;

receiving a second PDCCH signal indicating a second channel access procedure and a second priority class of the second channel access procedure from the network; and terminating the ongoing first channel access procedure and performing the second channel access procedure with the network, if the first priority class has a lower priority than the second priority class; and a processing circuit, coupled to the storage device, configured to execute the instructions stored in the storage device;

wherein the storage device further storing an instruction of performing the second channel access procedure with the network comprising:

determining a random number between a zero and a second contention window size;

storing the random number in a counter of the communication device; performing a carrier sensing on a channel;

determining that the channel is not occupied, if the channel is idle for a first time interval after performing the carrier sensing;

determining that the channel is occupied if the channel is not idle for the first time interval, and performing the carrier sensing on the channel;

decreasing the counter by one, if the channel is idle for a second time interval after determining that the channel is not occupied; and performing a second PUSCH transmission according to the second PDCCH signal, if the counter reaches the zero and the second PUSCH transmission is scheduled in a subframe.

9. The communication device of claim 8, wherein the storage device further storing an instruction of:

performing a second Physical Uplink Shared Channel (PUSCH) transmission according to the second PDCCH, after performing the second channel access procedure with the network.

10. The communication device of claim 8, wherein the communication device performs the first channel access procedure with the network according to a first contention window size for the first channel access procedure, and wherein the instruction of performing the second channel access procedure with the network comprising:

setting a second contention window size for the second channel access procedure according to the first contention window size.

11. The communication device of claim 10, wherein the instruction of setting the second contention window size according to the first contention window size comprising:

setting the second contention window size to be the first contention window size, if the first contention window size is one of a plurality of contention window sizes for the second channel access procedure.

12. The communication device of claim 10, wherein the instruction of setting the second contention window size according to the first contention window size comprising:

setting the second contention window size to be a maximum contention window size of a plurality of contention window sizes for the second channel access procedure, if the first contention window size is larger than the maximum contention window size.

13. The communication device of claim 10, wherein the instruction of setting the second contention window size according to the first contention window size comprising:

setting the second contention window size to be a minimum contention window size of a plurality of contention window sizes for the second channel access procedure, if the first contention window size is smaller than the minimum contention window size.

14. The communication device of claim 8, wherein the storage further stores the instructions of: receiving a signal indicating whether the second PUSCH transmission is performed successfully from the network; and selecting a third contention window size from a plurality of contention window sizes for the second channel access procedure, if the signal indicates that the second PUSCH transmission is performed unsuccessfully.

15. The communication device of claim 8, wherein the storage further stores an instruction of: performing a second PUSCH transmission according to the second PDCCH signal, if the second PUSCH transmission is scheduled in a subframe.

16. The communication device of claim 8, wherein the storage further stores an instruction of: decreasing the counter by one, if the communication device detects that the channel is idle for the first time interval.

17. The communication device of claim 8, wherein a length of the first time interval and a length of the second time interval are determined according to the second priority class.

* * * * *